United States Patent
Krebs et al.

(10) Patent No.: US 7,006,432 B1
(45) Date of Patent: Feb. 28, 2006

(54) ATM NETWORK MANAGEMENT SYSTEM

(75) Inventors: Lawrence W. Krebs, Purcellville, VA (US); Wayne Fuller, Herndon, VA (US); Joseph Abusamra, Sterling, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1009 days.

(21) Appl. No.: 09/110,661

(22) Filed: Jul. 7, 1998

Related U.S. Application Data

(60) Provisional application No. 60/051,991, filed on Jul. 9, 1997.

(51) Int. Cl.
*G01R 31/08* (2006.01)

(52) U.S. Cl. .................................. 370/218; 370/395.1

(58) Field of Classification Search ................ 370/216, 370/217, 218, 221, 225, 242, 389, 395; 714/2, 714/3, 4, 25, 26, 27
See application file for complete search history.

(56) References Cited

U.S. PATENT DOCUMENTS

| | | | |
|---|---|---|---|
| 5,640,505 A | * | 6/1997 | Hearn et al. ................... 714/24 |
| 6,041,037 A | * | 3/2000 | Nishio et al. ............... 370/228 |
| 6,052,371 A | * | 4/2000 | Lemieux ...................... 370/395 |

* cited by examiner

*Primary Examiner*—Bob A. Phunkulh
(74) *Attorney, Agent, or Firm*—Jim Zegeer

(57) ABSTRACT

An asynchronous transfer mode (ATM) management network, having the following functional areas: fault management, performance management, configuration management, security management and accounting management. Inference engine is used for the fault manager including correlation of ATM switch failures and traps and automating recommend courses of corrective action, and an inference engine is used for said performance management of said ATM management network.

2 Claims, 1 Drawing Sheet

ATM NETWORK MANAGEMENT SYSTEM

REFERENCE TO RELATED APPLICATION

This application claims benefit of provisional application Ser. No. 60/051,991 filed Jul. 9, 1997 and entitled ATM NETWORK MANAGEMENT SYSTEM.

INTRODUCTION

As a relatively new networking technology, Asynchronous Transfer Mode (ATM) currently has an immature set of tools available to manage it. ATM has introduced a new set of requirements for network management, due to ATMs support of voice, video, and data in a single local or wide area network, provisions for meeting Quality of Service (QoS) parameters of users, and ATM's use of virtual paths as opposed to the traditional physical network segments of other network protocols. Solutions that were adequate for other network technologies are insufficient for ATM, particularly in mission-critical applications.

At the core of an ATM network is an ATM switch, a device that is responsible for switching cells. The central functional block of the ATM switch is the switch fabric, which is responsible for buffering and routing the incoming cells to the appropriate output ports. Typically, software that runs on a network management platform monitors and controls the switch.

A "classical" definition of network management gives five major functional areas: fault management, performance management, configuration management, security management, and accounting management. To date, most of the solutions available for management of ATM networks have been focused on the area of configuration management. Most manufacturers of ATM switches have developed some level of network management products. These products primarily address the configuration management aspects of ATM network management, helping the user establish and maintain the communication paths and equipment that satisfy the requirement of the network and the needs of users of the network. In addition, existing solutions address a single vendor's ATM switch or switches. Mainly, because they have been developed by hardware vendors wishing to complement their line of ATM switches, existing ATM network management products are focused on that particular vendor's switches. However, in many real-world networks, customers maintain networks that are comprised of ATM switches from multiple vendors.

SUMMARY OF INVENTION

The ATM network management system of the present invention focuses on two areas of network management, fault management and performance management, and also provides tools for simulation and modeling. Its uniqueness is in its use of an inference engine that allows the system to build a set of rules for acting upon faults and alarms generated within the ATM network. The rules provide a level of intelligence that lets users be proactive in the management of their networks. Rather than having to act on each individual fault, alarm, or message, the system's intelligence correlates these events and recommends a corrective action.

An additional distinguishing feature of the invention is its ability to support multiple vendors ATM switches. The present invention incorporates sophisticated intelligence into the system's inference engine for heterogeneous ATM environments. The attached drawing is a schematic illustration of an ATM network incorporating the invention.

Thus, the object of the invention is to provide an improved ATM management network and method of operating an ATM management network.

DESCRIPTION OF THE DRAWING

The drawing is a functional block diagram of an ATM system incorporating the invention.

DETAILED DESCRIPTION OF FEATURES OF THE INVENTION

Figure 1:
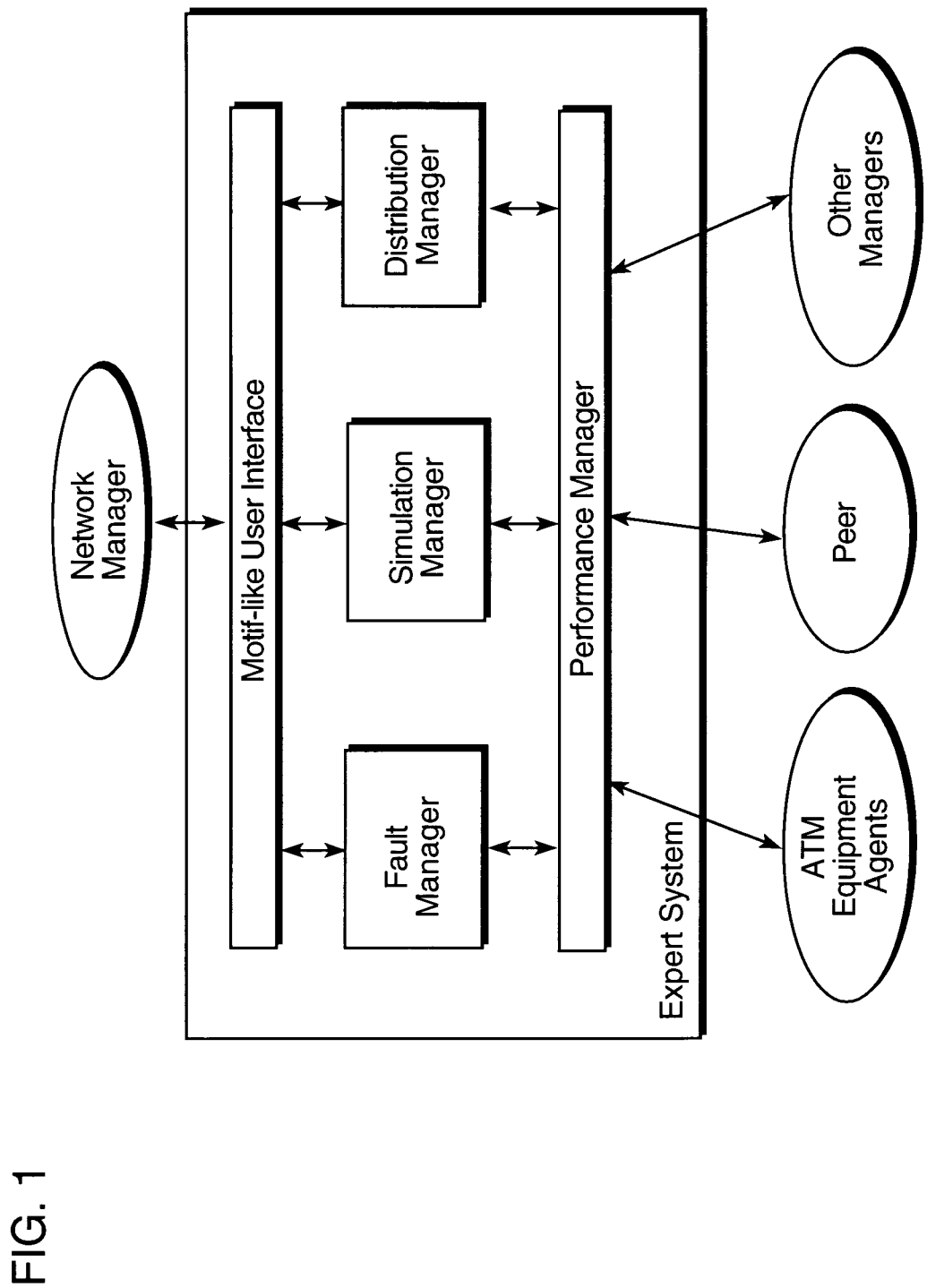

The present invention provides a unique solution for the management of ATM networks:

1. The ATM network management system of this invention utilizes an inference engine for fault management of ATM networks. This includes correlation of ATM switch failures and traps, and allows the invention to automate recommended courses of action to correct problems. There are other tools that perform correlation of faults, but none for ATM networks.

2. The ATM network management system of this invention utilizes an inference engine for performance management of ATM networks. This allows the invention to automate recommended courses of action when performance problems, such as bandwidth utilization and network performance degradation, occur within the ATM network. There are other tools that take automatic action due to performance problems, but none for ATM networks.

3. The ATM network management system of this invention provides the sophisticated diagnostics of fault and performance management, as outlined above, for multi-vendor ATM networks. There are other products that address some aspects of network management for ATM networks, but they mostly address configuration management issues and support only a single vendor. The invention is architectured to provide support for heterogeneous environments, even as new ATM switches are developed in the future.

4. The ATM network management system of this invention has a unique set of rules, designed and implemented using an inference engine, for implementing fault and performance management for ATM networks.

While the invention has been described in terms of a preferred embodiment of the invention, it will be appreciated that other embodiments, adaptations and modifications of the invention will be apparent to those skilled in the art.

What is claimed is:

1. In an asynchronous transfer mode (ATM) management network, having the following functional areas: fault management, performance management, configuration management, security management and accounting management, the method of operating said ATM management network comprising:
    (a) using an inference engine fault manager including correlation of ATM switch failures and traps and automating recommend courses of corrective action, and
    (b) using an inference engine for said performance management of said ATM management network.

2. In an asynchronous transfer mode (ATM) management network method defined in claim 1 including providing sophisticated diagnostics of fault and performance management for multivendor ATM networks.

* * * * *